Jan. 2, 1951         J. E. DAYGER ET AL        2,536,915
RECORD CONTROLLED PRINTING MACHINE WITH CHECKING
DEVICE TO CONTROL ACCUMULATOR ENTRIES
Filed Jan. 22, 1948                                8 Sheets—Sheet 3
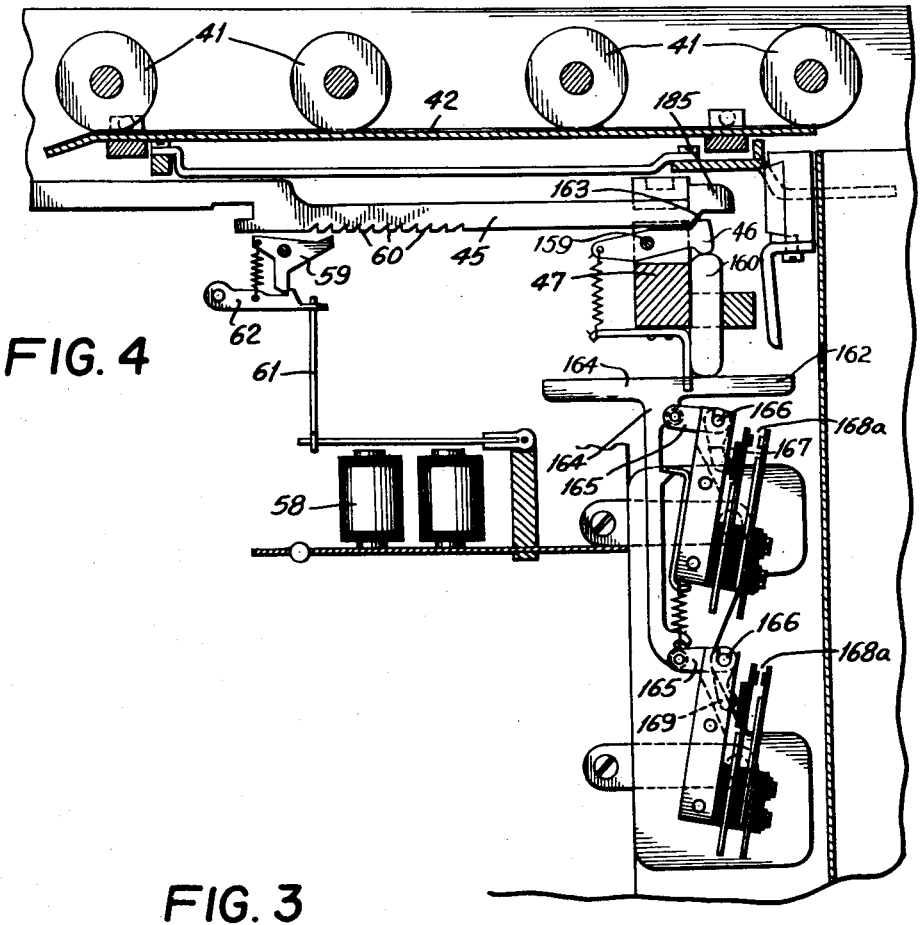
FIG. 4
FIG. 3
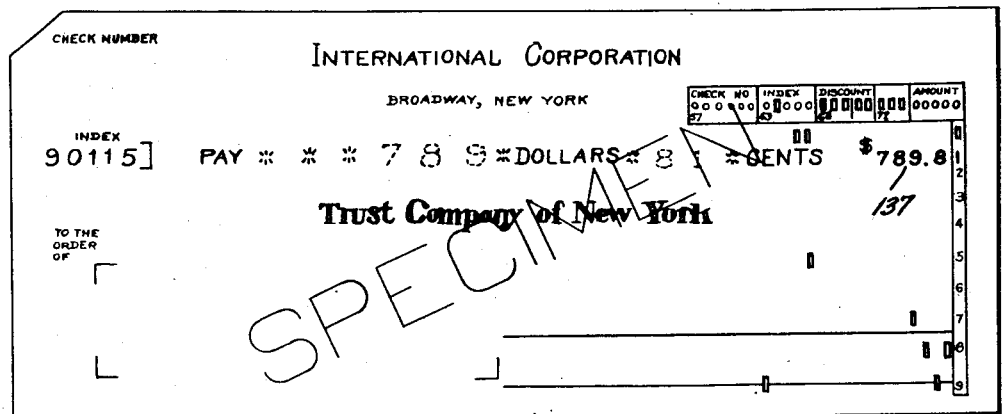
INVENTORS
JONAS E. DAYGER
ASA N. MILLER
BY
ATTORNEY Jan. 2, 1951  J. E. DAYGER ET AL  2,536,915
RECORD CONTROLLED PRINTING MACHINE WITH CHECKING
DEVICE TO CONTROL ACCUMULATOR ENTRIES
Filed Jan. 22, 1948  8 Sheets-Sheet 4

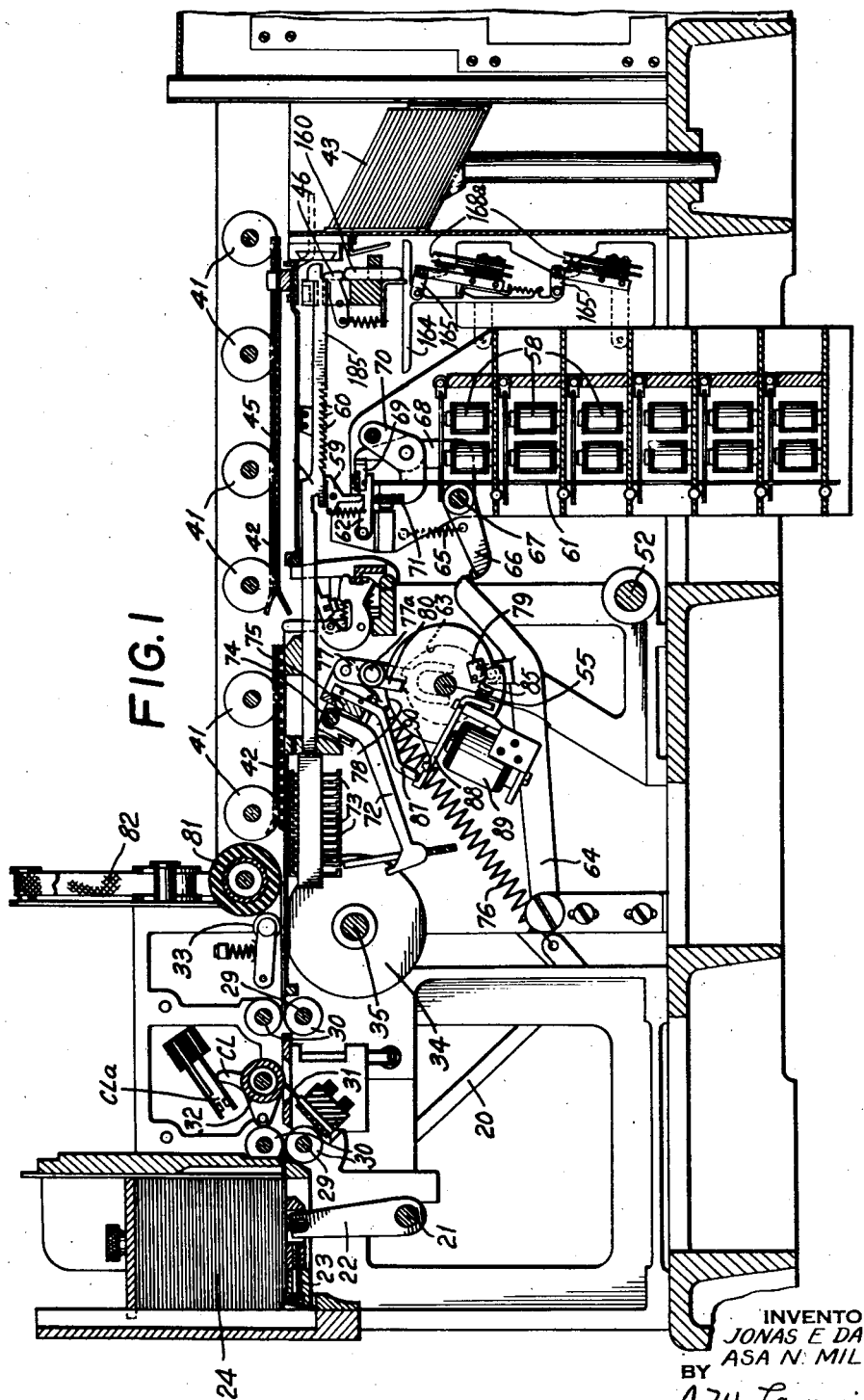

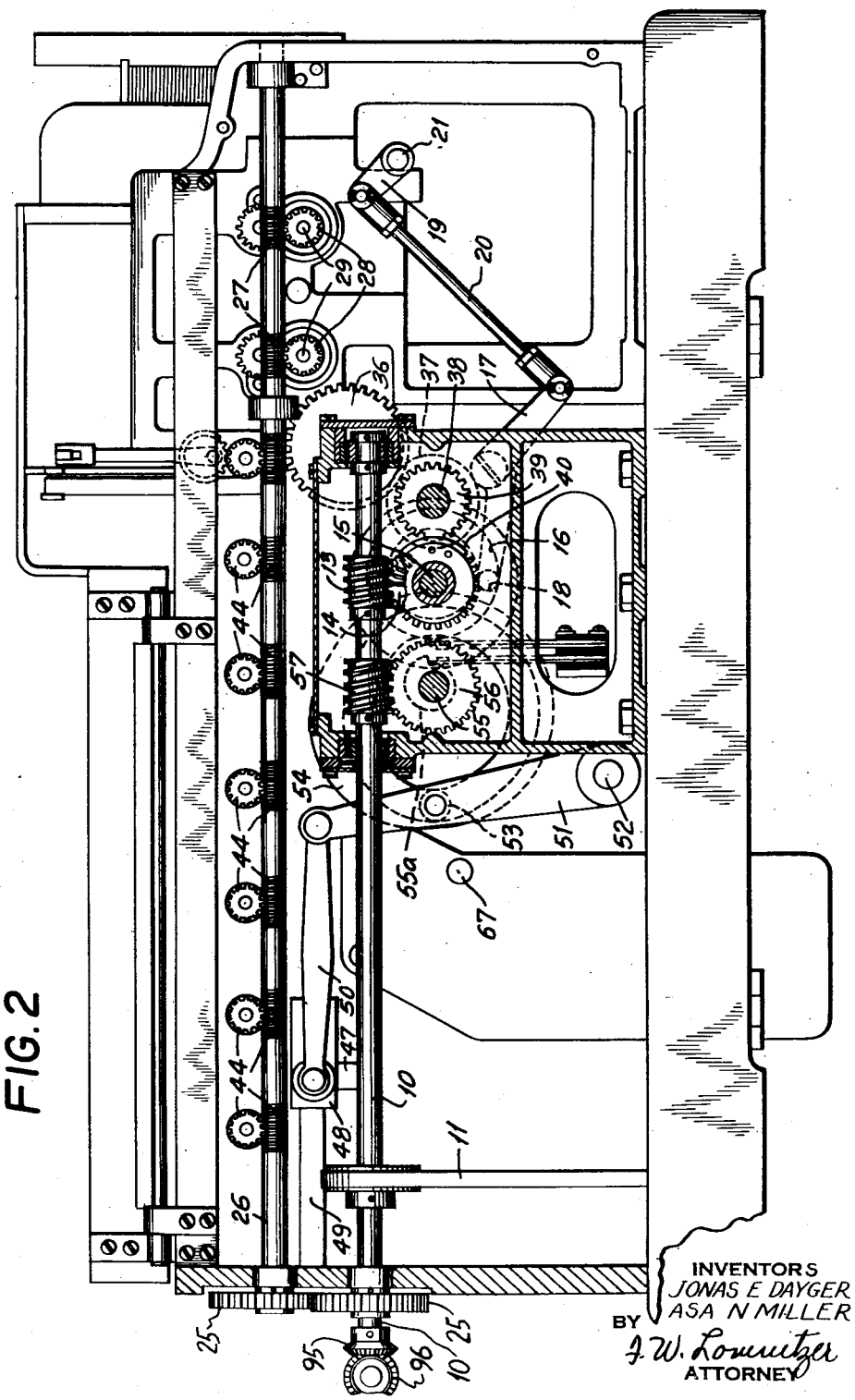

INVENTOR
JONAS E. DAYGER
BY ASA N MILLER
F. W. Lorimitzer
ATTORNEY

Jan. 2, 1951     J. E. DAYGER ET AL     2,536,915
RECORD CONTROLLED PRINTING MACHINE WITH CHECKING
DEVICE TO CONTROL ACCUMULATOR ENTRIES
Filed Jan. 22, 1948     8 Sheets-Sheet 6
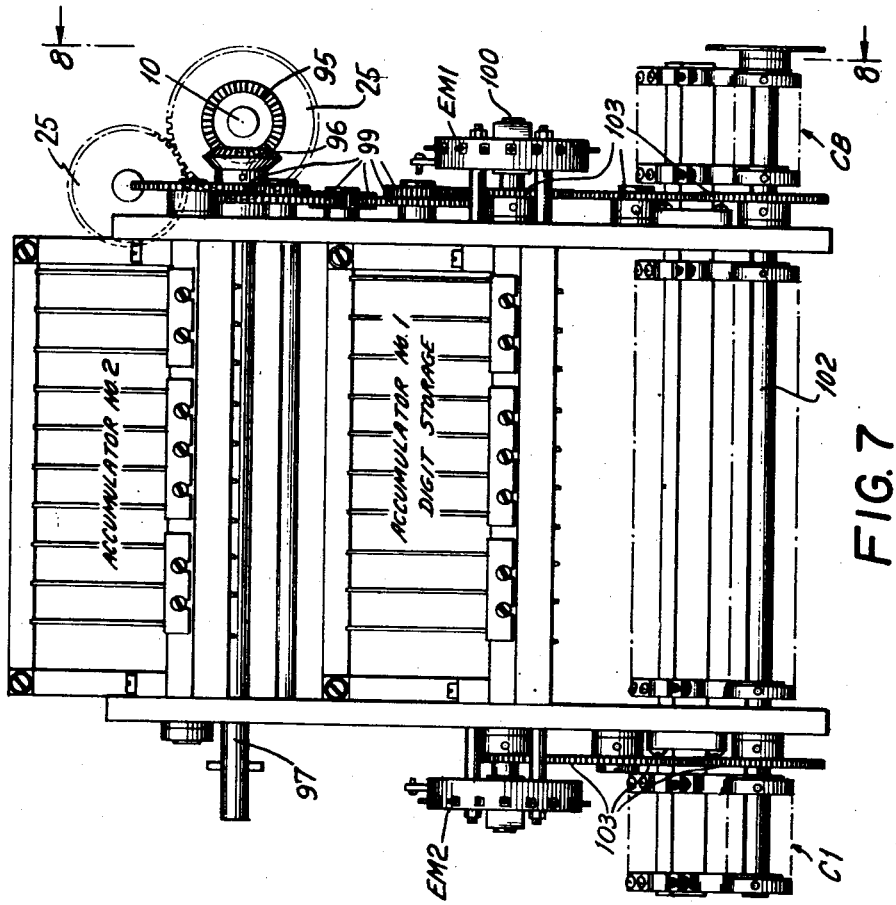
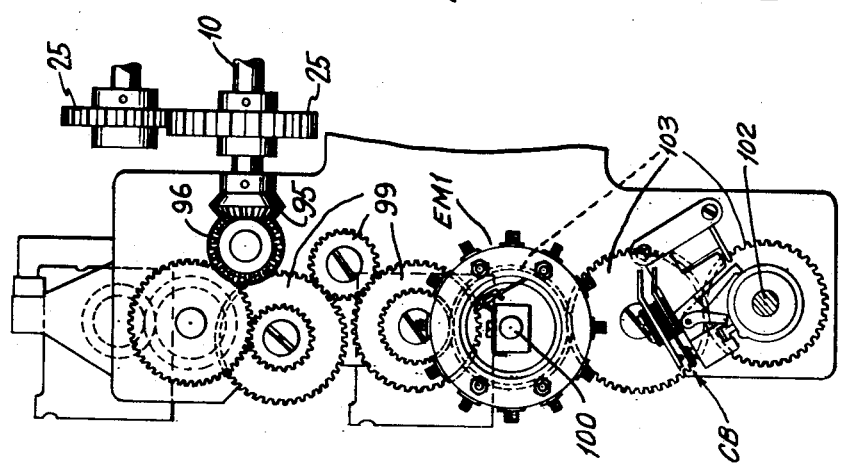
INVENTORS
JONAS E. DAYGER
ASA N. MILLER
BY
F. W. Lowmitzer
ATTORNEY

Patented Jan. 2, 1951

2,536,915

UNITED STATES PATENT OFFICE

2,536,915

RECORD CONTROLLED PRINTING MACHINE WITH CHECKING DEVICE TO CONTROL ACCUMULATOR ENTRIES

Jonas E. Dayger, Binghamton, N. Y., and Asa N. Miller, Hallstead, Pa., assignors to International Business Machines Corporation, New York, N. Y., a corporation of New York Application January 22, 1948, Serial No. 3,696

4 Claims. (Cl. 235—61.7)

This invention relates to record controlled machines and more particularly to machines of the type capable of sensing perforated records, interpreting the meaning of the perforations, controlling the operation of printing mechanism to print the amounts represented by the perforations on the records, and for controlling the entry of the amounts in the accumulator mechanism.

Machines of the above type have been utilized for printing on the perforated records to form checks issued for payment of some monetary transaction. It is very desirable that the amounts be printed in the checks at two places, one by protective type, that is, pin-point type capable of resisting alterations, and also to print the amount by type which is more legible.

Machines of the above type have been found to be highly accurate in their operations when used commercially; nevertheless, any single instance of improper printing should be guarded against, however rare its occurrence.

Such improper operations may result from wear of parts, dust, change in adjustment of parts, and the signaling to the user of such a change is an indication of a requirement of service for such machines to prevent repetition of improper printing.

The principal object of the present invention is to provide a checking arrangement for the above type of machine which checks the digit positions of the two sets of type bars against a digit storage means which is set up independently of the type bars, and upon a determination that both sets of type bars are set at corresponding digit positions to effect an entry in an accumulator under control of said digit storage means.

It is also an object of the present invention to provide a digit storage means which functions first as a checking device for the two sets of type bars, and then functions again as a means for effecting an entry in an accumulator.

It is a still further object of the invention to enlarge the checking arrangement so that the digit setting of the storage means can be compared with the digit setting of two sets of type bars concurrently and simultaneously set up, and upon determination that there is equality in digit representation all around, then utilize such storage means to effect an entry in an accumulator.

A further object of the invention is to devise means to detect the presence of a blank, or unpunched column of a card, and to suspend printing on a card upon such eventuality.

A still further object of the invention is to include means which detects the improper positioning of a type bar of an order in which an intermediate zero should be printed, instead of an * or blank in case it should not go to 0 or the proper digit position.

A still further object of the invention is to include an accumulator which will accumulate the values represented upon the cards as long as the two sets of type bars correspond to the digit settings of the storage means, and to cause the printing of the total upon a specially designated card which passes through the machine.

A general object of the invention is to include a control of the accumulator and printing means which prints from the type bars upon the cards so that in the event that a type bar, of any order, in either of the two sets is improperly set, and does not correspond to the digit setting of the digit storage means, such control will be effective to prevent an entry in the accumulator, and suppress the printing operation.

A still further object of the invention is to arrange the settable devices for the storage means and the type members so that they are concurrently and differentially set during digital index times and to presumably coinciding digital positions; to provide contact devices closed by each type member and a readout set by the related orders of the storage means; and the provision of means to compare in each order and after every setting the setting of the contact devices and the related orders of the readout.

A still further object, related to the specific manner of effecting a comparison, is to effect, upon finding a coincidence in the setting of the contact devices and readout an impression from said type members, and to effect, under control of said digit storage means, the operation of an entry control means for an accumulator.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a central sectional view of the machine in which the present invention is incorporated.

Fig. 2 is a side elevational view partly in section taken at one side of the machine.

Fig. 3 shows an interpreted card.

Fig. 4 is a view showing a contact operating mechanism operated by the stopping of a type bar.

Fig. 7 is a side elevational view showing the driving mechanism for the impulse emitters and cam contacts.

Fig. 8 is an end view taken in the line 8—8 of Fig. 7.

Figure 9:
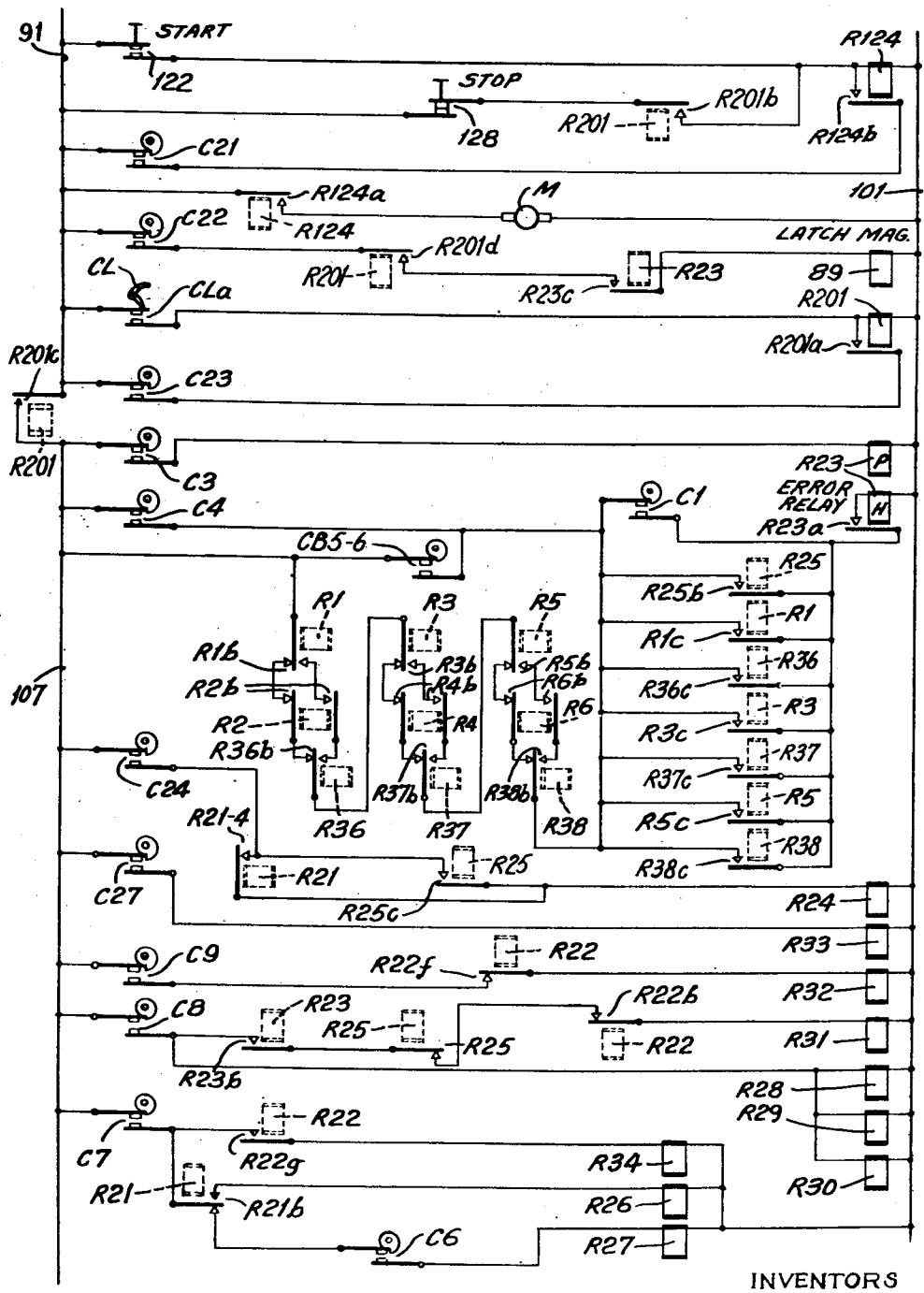
Figure 9A:
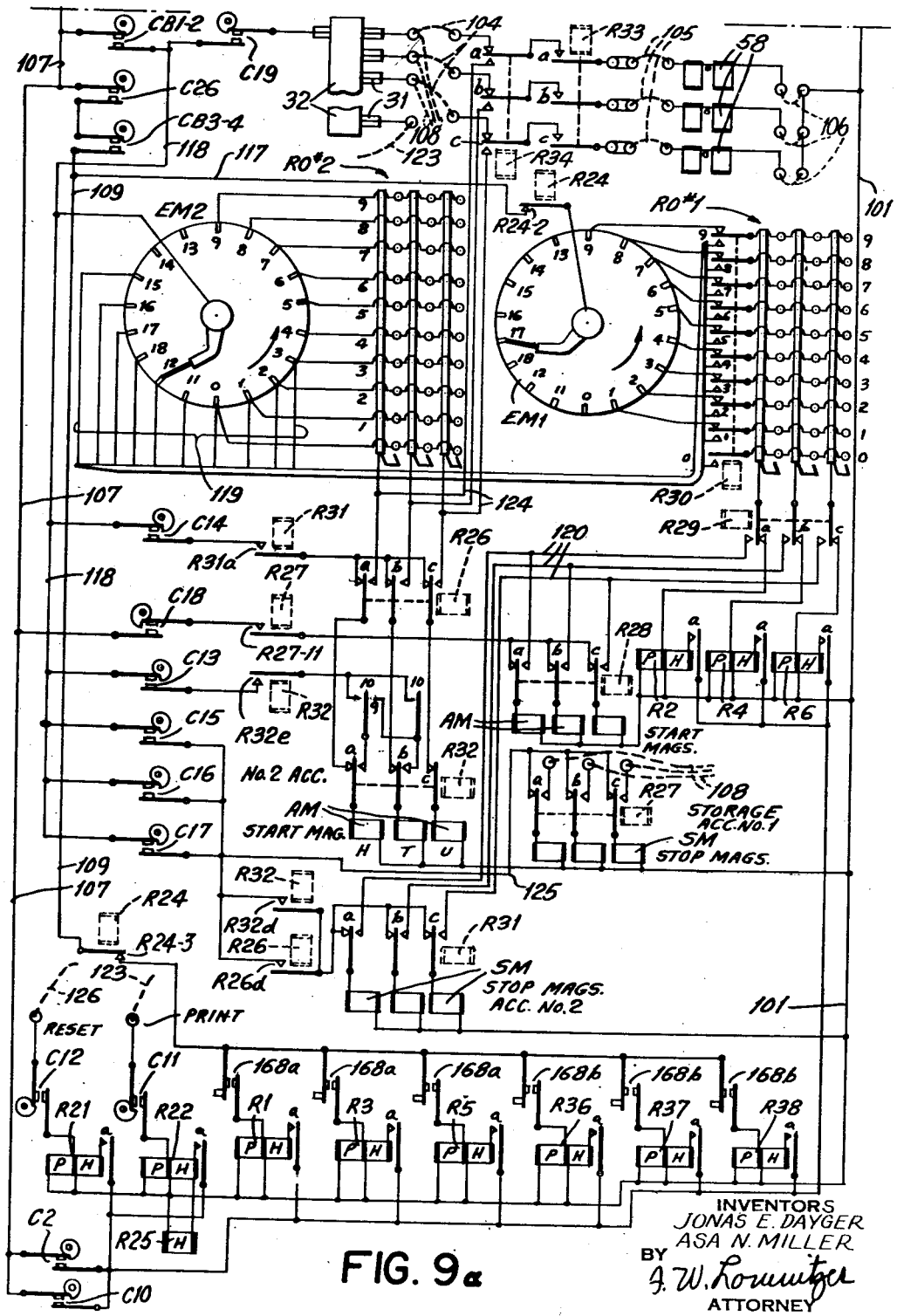

Figs. 9 and 9a joined together with Fig. 9 on top comprise a wiring diagram of the machine.

Figure 10:
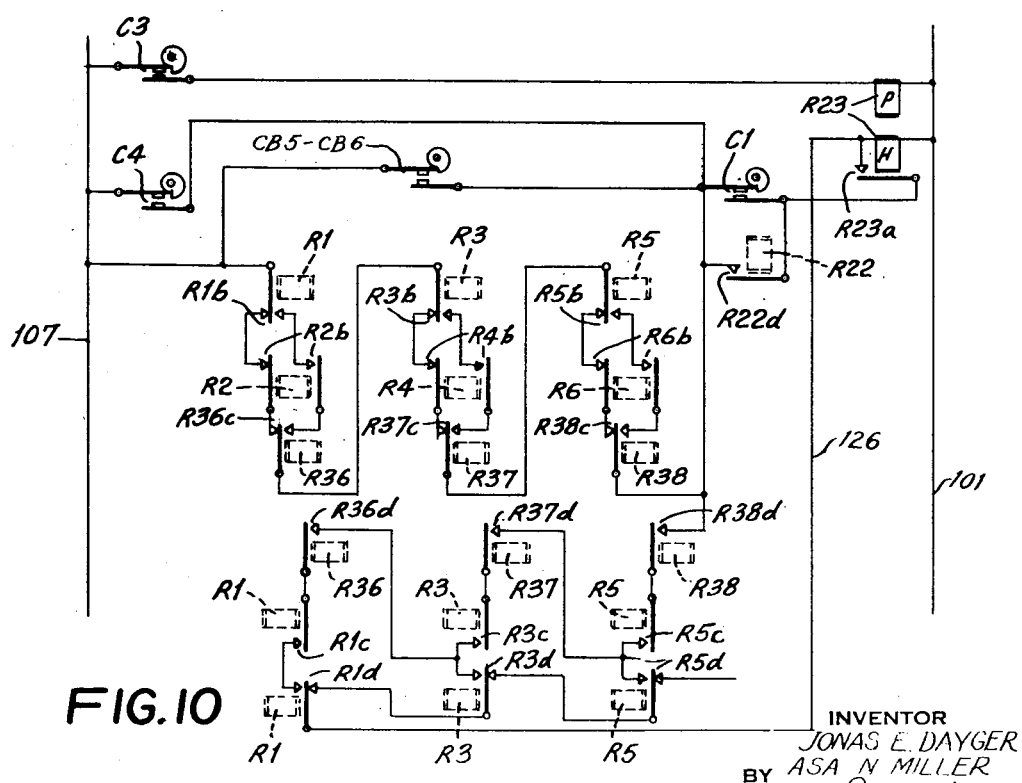

Fig. 10 is a wiring diagram representing a modification of the wiring.

The present invention is incorporated in a machine which is shown in complete detail in the patents to G. F. Daly, No. 1,946,900 and R. E. Page, No. 2,019,869 to which reference may be had for an understanding of the details of construction of the illustrative machine.

Card Feeding Mechanism

In more detail 10 (Fig. 2) represents the main drive shaft of the machine. This may be driven in any suitable manner as by an electric motor through belt 11 rotating a pulley attached to shaft 10.

From shaft 10 a worm 13 (Fig. 2) drives worm wheel 14 secured to a shaft 15 to which is also secured a box cam 16. A pivoted cam follower arm 17 has a roller 18 at one end riding in the cam groove and at the other has a connection to an arm 19 through adjustable pitman 20.

Arm 19 is secured to a shaft 21 having arms 22 (see Fig. 1) in pin and slot engagement with a card picker 23 mounted for reciprocation in the frame of the machine. This reciprocating picker mechanism is adapted to advance one record card at a time from the supply stack or magazine 24.

Through gears 25 shown in Fig. 2, shaft 10 drives a parallel shaft 26 which has threaded worm sections 27 meshing with worm gears 28 secured to feed roller shafts 29 to drive feed rollers 30 (Fig. 1) constantly. The card which is advanced by the picker 23 passes into the bite of the first pair of feed rollers 30 to the left in Fig. 1 and is subsequently guided to the analyzing or perforation reading devices which comprise brushes 31 and a contact roller 32. These brushes and contact roller are of conventional structure such as is commonly used in electrically controlled tabulating machines.

After passing the analyzing brushes 31 each card passes to the second pair of feed rollers 30 which advance said card to a pair of intermittently driven rollers comprising upper spring-pressed rollers 33 and lower rollers 34 which engage the edge of the card. These rollers 33 and 34 advance the card to printing position at which time they momentarily pause in their rotation to stop the feeding of the card to permit printing on the card in accordance with the preceding analysis.

This interruption in the advance of the card is accomplished as follows: Rollers 34 are secured to a shaft 35 (Fig. 1) journaled in the frame of the machine and having attached at one end a gear 36 (Fig. 2) meshing with a gear 37 on shaft 38 on which shaft is also a gear 39 adapted to be driven by a mutilated gear 40 mounted on the continuously rotated shaft 15.

Thus, during the rotation of shaft 15 the gear 40 will pick up gear 39 to advance each card to printing position, whereupon, at this time, the toothless portion of gear 40 moves into locking engagement with gear 39. After printing has been effected, gear 39 is again engaged for rotation and the card is fed forward to a conveying means (Fig. 1) comprising rollers 41 and tracks 42 which convey the card to a suitable stacker 43. The shafts upon which rollers 41 are secured are adapted to be continually driven by the gear connections 44 (Fig. 2) to the shaft 26.

It should be mentioned that a conventional type of card lever CL (Fig. 1) is arranged between the sets of rollers 30 for closing card lever contacts CLa. This card lever is operated by each card to close the CLa contacts according to the timing shown in Fig. 6.

Printing Mechanism

For effecting the printing on the record cards as they successively pass through the machine, a plurality of type bars 45 (Fig. 1) is provided. All of these bars are mounted for reciprocation in the frame of the machine and each has a connection through a spring-pressed pawl 46 to a crosshead 47 which cause each type bar to move with the crosshead in its leftward movement. Thus, in Fig. 1, upon movement of crosshead 47 to the left, the pawls 46, through frictional engagement with bars 45 will move the type bars concurrently in the same direction.

The bars may be arrested at any point in their travel, and subsequently the pawls 46 will disengage from, and permit the further movement of the crosshead 47. Upon the reverse movement of crosshead 47 the shoulders 185 (Fig. 4) of the bars 45 will be engaged thereby to positively move the bars to restored position. For reciprocating the crosshead 47 the following mechanism is provided.

As shown in Fig. 2 the crosshead 47 is connected at its ends to blocks 48 slidable upon rods 49 and having pivoted link connections 50 to a follower arm 51 pivoted at 52. Arm 51 has a roller 53 cooperating with the cam groove of a box cam 54 mounted on a shaft 55 connected through worm gear 56 and worm 57 to the constantly running shaft 10. The arrangement and timing of the parts is such that the type bars 45 are advanced synchronously with the movement of a card past the analyzing or sensing brushes 31.

If a perforation at, say, the 5 position on the card is under the sensing brushes, the corresponding type representing 5 will be at the printing line. The establishment of an electric circuit through the index point perforations by the brush sensing one column is adapted by circuits to be described to energize a magnet 58 (Fig. 1).

There are a number of these magnets 58, each magnet being related to a corresponding type bar 45 and card column. The energization of any magnet is adapted to release a pawl device 59 through a wire 61 and latch 62 and allow it to engage one of the ratchet teeth 60 on the bar 45. After pawl 59 has engaged the teeth 60, further movement of the type bar 45 to the left in Fig. 1 is prevented. As stated, the type bars 45 are positioned during a passage of a card past the brushes and subsequently these type bars are held during the period that a card passes from the analyzing station to printing position and during the printing operation. After the printing operation, pawls 59 and latches 62 are positively restored in the following manner.

Secured to shaft 55 is a cam 63 (Fig. 1) which cooperates with and actuates a follower arm 64 pressed upwardly by a spring 65 acting through an arm 66 on shaft 67. The shaft 67 has secured thereto arms 68 which carry a restoring plate 69. Arms 70 pivoted to arms 68 carry a restoring plate 71. By this construction cam 63 is adapted to move plate 69 to the left to restore pawls 59 and plate 71 is moved upwardly to restore latches 62 and their connected wires 61.

The printing operation about to be described is under the control of a print magnet 89 which will be explained later cn.

For each type bar 45 there is an individual hammer 72 which is adapted to strike the particular type 73 positioned at the printing line on the type bar. The hammers are pivotally mounted on a rod 74 carried by a bar 75 and depend for their actuation upon movement of said bar. The bar 75 is pivoted on the frame of the machine by pintles coaxial with rod 74 and has springs 76 connected thereto for biasing the bar in a clockwise direction in Fig. 1.

To the middle of bar 75 there is pivoted a cam follower arm 77 bifurcated to straddle shaft 55 and having a roller 77a in cooperation with a cam 78. Fixed to one face of the cam 78 is a cam member 79 which cooperates with a projection 80 of the cam follower arm 77.

As the cam 78 revolves, by virtue of the shaft 55 being driven in the manner previously described, it cooperates with the arm 77 through its follower roller 77a, gradually retracting the hammers 72 in a counterclockwise direction against the tension of springs 76.

As the roller 77a leaves the high point of the cam 78 member 79 will underlie the projection 80 and upon continued rotation of the cam the projection 80 drops off the member 79 and the springs 76, thus released, turn the common bar 75 in a clockwise direction to swing the hammers 72 against type 73 thus effecting printing.

By circuits to be described later, a timed impulse, conditionally established by the congruity of digit values in the type bars and the digit storage means, energizes the control magnet 89, previously mentioned, which causes armature 88 to be attracted. The attraction of the armature allows an arm latch 87 secured to common bar 75, to disengage from armature latch surface 90. It is this operation that permits the common bar 75 to rotate clockwise, in the manner previously explained, to swing the hammers 72 against the type 73. Spring 92, confined on one end by stop 85, returns armature 88 to its original position when the magnet 89 becomes deenergized.

Referring to Fig. 1, 81 designates a printing platen journaled in the frame of the machine and adapted to be rotated by frictional engagement with the passing card to prevent excessive wear at any one place. The inking ribbon devices are of conventional form and require no detailed description, the ribbon 82 being guided along the platen 81 and beneath the tabulating card.

In the event that digit values set up in the type bars and the storage unit do not conform, the timed impulse previously mentioned is suppressed, thus printing for the particular cycle will be suppressed and is explained in the following manner. The suppression of the timed impulse prevents energization of magnet 89. Thus, armature 88 remains in engagement at surface 90 with latch arm 87 which prevents further cooperation between follower roller 77a and cam 78 as the high point of the cam passes by the follower roller. For the same reason cooperation is suppressed between cam member 88 and block 79; thus common bar 75 will not displace hammers 72 for the particular cycle.

CAM CONTACTS

Referring to Figs. 7 and 8 the continually running shaft 10 carries a bevel gear 95 meshing with a bevel gear 96 secured to a drive shaft 97. Shaft 97 carries gears which are similar to gears 18 of the Lake Patent No. 2,328,653 for driving accumulator elements of No. 2 accumulator. From shaft 97 there is a gear driving train 99 to a shaft 100 which is the main accumulator drive shaft for No. 1 accumulator which is used as a digit storage means. Drive shaft 100 drives the rotatable brush elements of two emitters EM1 and EM2. From each end of drive shaft 100 there is a gear drive train 103 to a shaft 102 which carries cams for operating the C1 cam contacts, and the CB cam contacts.

DUPLICATE PRINTING UPON CHECKS

In the present machine it is desirable to print the amount on the card check at two places as shown in Fig. 3. One printing is by pin point type which produces an unalterable record. The other figures, 137, in Fig. 3 are of a more conventional type. This manner of printing is fully shown and described in the patent to R. E. Page, No. 2,019,869.

CHECKING FOR SIMULTANEOUS POSITIONING OF THE TWO SETS OF TYPE BARS

It is desirable to check the position of the two sets of type bars which print at the two places on the check to ascertain whether the simultaneous positioning of both sets is effected. This is performed by mechanism shown particularly in Fig. 4 and will be further explained in connection with the wiring diagram.

For each type bar of the two sets there is provided a spring urged pawl 46 pivotally secured to the crosshead 47 at shaft 159. When pawl 59 is unlatched, due to the energization of magnet 58, it will engage a tooth 60 on type bar 45 as the cross head 47 moves to the left. Concurrently, spring urged pawl 46 is moved clockwise by cam surface 163 to cooperate with plunger 160 which, in turn, actuates a T-shaped lever 164 at surface 162, the T lever being carried by two levers 165 and 167 loosely mounted on rods 166.

The lever 165 is shaped with an arm to actuate a contact 168a. In the first denominational order shown in Fig. 4 the armed lever 165 is at the upper end of the T lever 164 while in the next denominational order the lever 165 is at the lower end of the T lever and operates a contact 168a in a lower level (see also Fig. 5 of Patent No. 2,247,914).

This construction is desirable in order to provide for the proper side spacing of the contacts 168a and the operating mechanism since each is substantially wider than a type bar 45. The above arrangement is repeated for the next two adjacent orders of the same set of type bars. Each of the five type bars of one set will cause the closure of a related pair of five pairs of contacts 168a.

A similar construction is provided for the other set of type bars and the five pairs of controlling contacts are designated 168b in Fig. 9a.

Obviously for the same denominational order the contacts 168a and 168b closed by type bars 45 of two sets will close at the same time if both type bars are set to the same positions.

ACCUMULATORS

It is preferable to utilize the type of accumulator fully shown and described in Patent No. 2,328,653, issued to C. D. Lake et al., granted September 7, 1943, to recieve the values represented upon a card if certain conditions have been detected.

Figure 5:
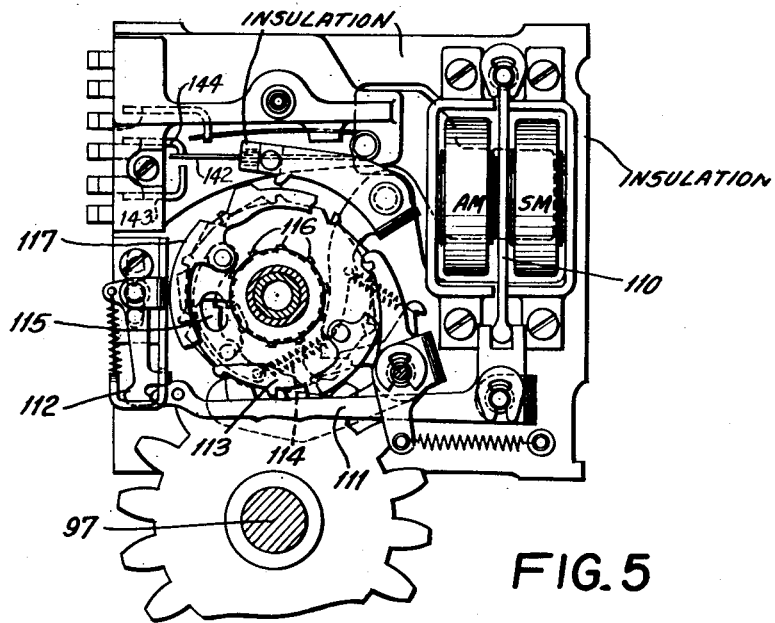
Fig. 5 is a view showing one order of an accumulator element of a form preferably employed in connection with the present invention.

Fig. 5 shows one order of this form of accumulator which is similar to that in the designated patent but shown herein modified to include necessary changes which will be later explained. Since the detailed construction and operation of this accumulator is fully set forth in the patent, a brief description will suffice.

The pivoted armature 110 is normally between the cores of the advance magnet AM and the stop magnet SM and said armature has at its free end a connection to a clutch lever 111. In the declutching position of the clutch lever 111 shown in Fig. 5 the armature 110 is biased against the core of the SM magnet. Whenever the AM magnet is energized the armature 110 will take an alternative position, rocking the clutch lever 111 to a clutching position, the clutch lever 111 being held in either clutching or declutching position by a resilient latch member 112.

A feature of the accumulating unit is that the armature 110 will remain biased by latch member 112 against the AM or SM magnet that last attracted it. If, at the time, either of such impulses are transmitted, the sensing commutator transmits an impulse to the SM magnet the AM and SM magnets will be concurrently energized and no digit entry will be effected. A transmission of a digit impulse to the stop magnet SM concurrently with the AM advance magnet will not result in the clutching of an accumulator element. The reason for this is that the force of attraction exerted by the SM magnet on armature 110 will be greater than that exercised by the AM magnet, because of the normal airgap between the armature 110 and the core of the AM magnet.

Clutch lever 111 is shown in declutching position and when moved to a clutching position it releases a disk 113 for counterclockwise movement and a spring 114 is now effective to rock clutch pawl 115 into engagement with a constantly rotating ratchet wheel 116. As a result of this clutching operation an accumulator element 117 is initiated in rotation. The termination of the rotation of the accumulator element is effected as a result of the energization of the SM stop magnet in entering values, and also by an electrical circuit to be described at the end of a carry operation. In either case this will rock the clutch lever 111 to declutching position.

The accumulator drive shafts 97 and 100 for accumulators No. 1 and No. 2 correspond to shaft 19 of the aforementioned Patent No. 2,328,653. From Fig. 7 it will be recalled that a bevel gear 95 carried by the main drive shaft 10 meshes with a bevel gear 96 secured to the aforementioned drive shaft 97. This constitutes in the present machine the driving means for the accumulator wheels and other parts of the accumulator No. 1, which herein is used as a digit storage means. The gear drive for the accumulator drive shaft 100 was previously explained. Accumulator No. 2 is utilized to accumulate amounts represented on the cards.

Associated with each accumulator is an electrical readout which is of a form well known in the art. In general, the readout for each order consists of a brush rotatable by the accumulator element to make contact with a conducting segment and individual digit representing segments. Details of construction of one form of such readout can be found in the patent to C. D. Lake et al., No. 2,232,006. In the wiring diagram the readouts are generally designated RO.

The emitters designated EM1 and EM2 are driven two revolutions for each machine cycle. The timing of the effective spots of each emitter is shown in the timing diagram of Fig. 6.

CIRCUIT DIAGRAM

To start the machine in operation the operator closes a main line switch (not shown) to supply current to lines 91, 101 (Figs. 9, 9a) and then depresses a "Start Key" to complete a circuit from line 91, through start key contacts 122 (Fig. 9), motor relay R124 to line 101. R124 closes the R124a relay contacts to complete an obvious circuit to motor M to cause the feeding of cards so that a card lever CL is operated. The latter closes the CLa contacts to complete an obvious circuit to R201 relays. R201 closes its stick contacts R201a so that a hold circuit extends back through C23 cam contacts to line 91 to hold R201 energized until the end of the cycle (see Fig. 6). R201b contacts complete a first holding circuit through such contacts R201b and stop key contacts 128 to line 91 to hold the R124 relay energized until the end of the cycle. A supplemental hold circuit for R124 relay is through the C21 contacts to line 91 which open at a certain period in a cycle. If a card has been fed in this cycle said first circuit will keep the motor relay R124 energized and the machine will continue to run.

It will be seen from Fig. 9 that closure of R201c card lever contacts connects the main line side 91 to a line side 107 so that circuits connected to line side 107 depend for their closure upon the continued closure of R201c card lever contacts.

1. *Type bar setting control circuits*

The circuit for energizing the type bar stopping magnets 58 is from line 107, through circuit breaker contacts CB1-2 (Fig. 9a), cam contacts C19 which are closed during the analysis of the X-9 card perforations, contact roller 32, brushes 31 of the columns representing the value to be printed, plug connections 104, R34, a, b, c transfer contacts now normal, R33, a, b, c contacts, closed during analysis of the 1-9 holes, plug connections 105, magnets 58, plug connections 106 to line 101. The R33 relay (Fig. 9) is held energized during the time the 1-9 holes are analyzed by an obvious circuit controlled by cam contacts C27. By the differentially timed impulses transmitted to magnets 58 the type bars are set at desired digit positions.

2. *Circuits for setting storage accumulator No. 1 to represent and store up representation of amount on card*

To start the wheels in rotation an impulse is transmitted to the start magnets AM at the 0 time. The impulse circuit is from line 107, through cam contacts C18 (Fig. 9a) which close at the 0 impulse time, R27—11 relay contacts now closed, R28a, b, c contacts now closed, to the series of start magnets AM for each order of the storage accumulator No. 1 to line 101. At about the time C18 cam contacts close the R27 relay is energized by a circuit from line 107, C7 cam contacts (Fig. 9), R21b transfer contacts now normal, C6 cam contacts, R27 relay to line 101.

To stop the wheels in rotation at their differential positions to indicate the amount or value represented on the card the following circuit is operative:

The differential impulses from the brushes 31 (Fig. 9) are transmitted by plug connections 108, through R27, a, b, c relay contacts, now transferred, to stop magnets SM of storage accumulator No. 1 to line 101. The R27 relay is picked up by the circuit just traced.

It should be noted that if a 0 is indicated on a card column both magnets AM, SM will be energized concurrently, which will prevent the rotation of that wheel from a 0 position. By these circuits a series of wheels of storage accumulator No. 1 are set up to store and represent by its associated readout RO#1 the amount on the card which is compared by electrical comparing circuits with the digit setting of the type bars.

CIRCUITS FOR SETTING UP TYPE BAR CONTROLLED COMPARING RELAYS

This circuit for each order is from line 107, through cam contacts C26 (Fig. 9a) which are closed during the different times that the type bar contacts 168a are closed, through circuit breaker contacts CB3—CB4 timed to close substantially at the time the type bar contacts 168a are closed, wire 109, normally closed R24—3 relay contacts, type bar contacts 168a of each order, to the related pickup or P winding of R1, R3 or R5 relays, of each order, to line 101. Each coil when energized closes its a holding contacts to energize the H holding winding which is held energized by a circuit from line 101, through the a contacts, the H holding winding, and cam contacts C2 to line 107. Cam contacts C2 hold each R1, R3, R5 relay energized for most of the cycle.

The type bar contacts 168a close at approximately two points in the cycle after the print magnet 58 receives an impulse from the analyzing brushes. It will be seen from Fig. 6 that the type bar contacts 168a close at times designated 1-9, and 0, but the closure of these contacts occurs two points after the corresponding index points are analyzed. The delay in closing contacts 168a is due to the time it takes for the contact operating mechanism to operate. It will also be seen from Fig. 6 that the impulses directed to comparing relays R1, R3, R5 by the CB3—4 circuit breaker contacts occur for the same digits at the same time contacts 168a close.

In a similar way relays R36, R37, and R38 are energized at differential times through their related contacts 168b.

Figure 6:
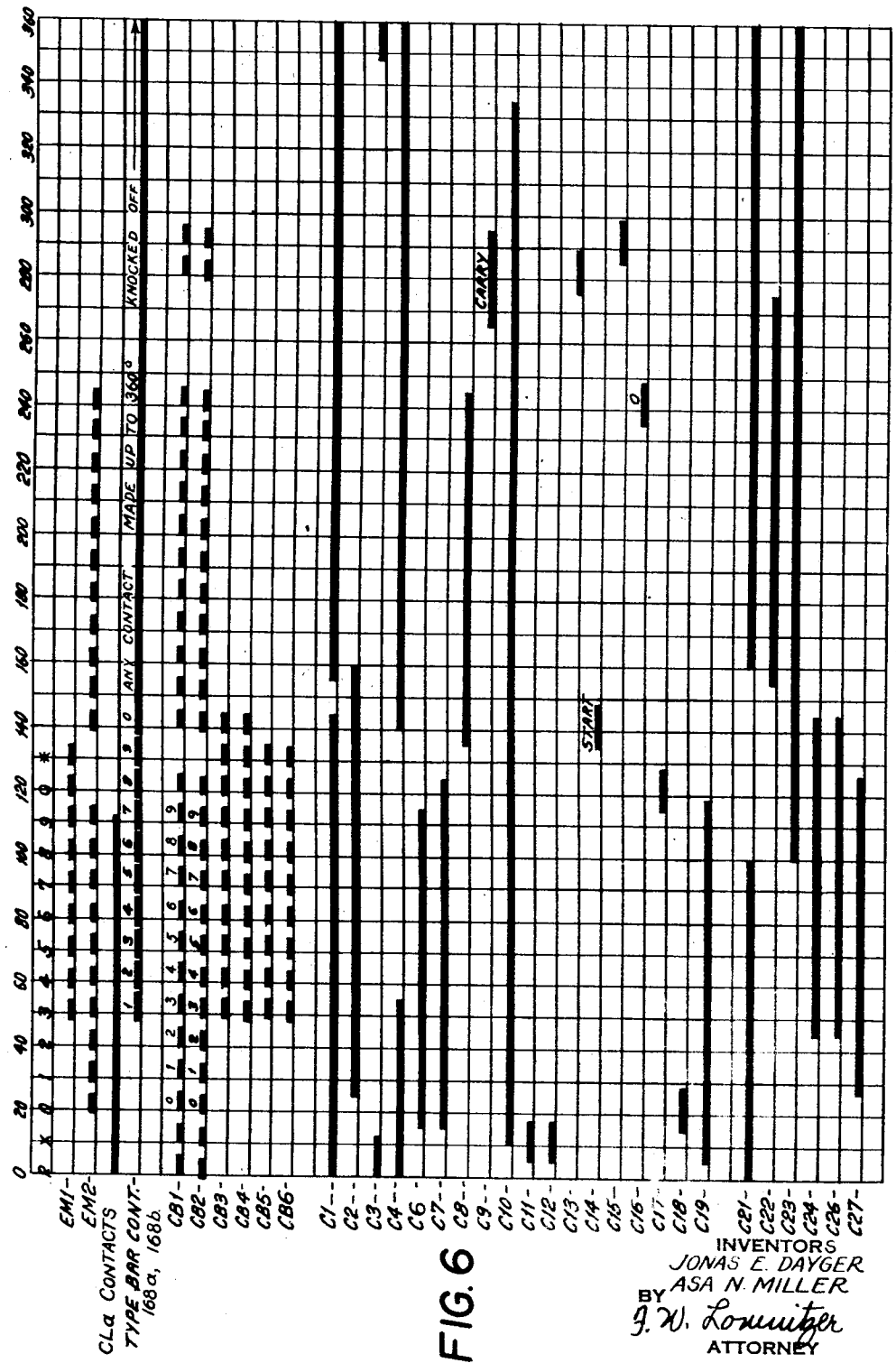
Fig. 6 is a timing diagram.

It should also be noted from Fig. 6 that CB1—2 contacts close at the same times that the corresponding index point positions are analyzed so that the impulses directed to the AM magnets of the accumulator No. 1 will have caused the accumulator wheels, and the readout RO#1 to be at digit positions before the comparing relays R1, R3 and R5 are picked up.

CIRCUITS FOR SETTING UP STORAGE CONTROLLED COMPARING RELAYS

This circuit extends from line 107, through cam contacts C26, circuit breaker contacts CB3—4, as before, wire 117, through R24—2 relay contacts normally closed, the brush of emitter EM1, the segments thereof, the transfer contacts 0-9 of the R30 relay now in normal position, and, dependent upon the digit setting of a brush in each order of the readout of the storage accumulator No. 1, an impulse from the emitter EM1 is transmitted through the a, b, or c contacts of the R29 relay now at normal position, to the pickup winding of the respective R2, R4, R6 relays, to line 101. The hold circuit for such relays is also through the respective hold contacts a and the C2 cam contacts, the same as for the R1, R3, R5 relays.

The emitter EM1 is timed to transmit digit impulses under control of the readout RO#1 which are two points in time after the accumulator wheel and readout brush have been stopped. This delay in transmission of impulses makes them coincident in point of time with the transmission of impulses to the R1, R3, R5 relays. Thus, the impulses are directed to the R2, R4, R6 relays at the same points in the cycle, and if the digit positions of the type bar and readout are the same the paired relays R1, R2; R3, R4; and R5, R6 should be energized at the same time.

COMPARING CIRCUIT FOR DETECTING NON-CORRESPONDING DIGIT POSITIONS OF TYPE BARS AND STORAGE ACCUMULATOR

This comparing circuit determines whether in each order the type bar and readout brush are stopped at corresponding digit positions which should correspond to the digit representing perforation in a controlling card column. It will be recalled that upon a coincidence in the digit positions each pair of relays, such as R1, R2; R3, R4; and R5, R6 (only three columns being shown by way of example) will be concurrently energized. If there is concurrent energization in each order, reflecting the corresponding digit positions of the type bar and readout brush, then the machine will continue its operation, otherwise printing will be prevented by a circuit arrangement now to be described.

At the end of each cycle, and for a short period at the beginning of the next cycle, C3 cam contacts (Fig. 9) close to energize the pickup winding P of the R23 relay by an obvious circuit. The latter closes the hold contacts R23a, thereby energizing the H or holding winding of such relay by a circuit from line 101, through R23H relay coil, R23a relay contacts, C1 cam contacts and C4 cam contacts to line 107. While C1 contacts remain closed during the time that error detecting impulses are transmitted, the C4 cam contacts open at 55° of the machine cycle to thereby enable circuit breaker contacts CB5 and CB6 to establish the hold circuit, which latter opens after each closure, for each successive cycle point from 50° to 130° to determine whether a supplementary holding circuit, now to be described, has been maintained just before such contacts open. It will be seen from Fig. 6 that CB5—6 impulses occurring between 50° to 130° are coincident with the CB1—2, CB3—4 impulses, and coincident with the time of energization of the comparing relays R1—R6. This supplementary shunt circuit around CB5—6 extends from one side of CB5—6, serially through the R1b transfer contacts, R2b transfer contacts, R36b transfer contacts, R3b transfer contacts, R4b transfer contacts, R37b transfer contacts, thence through the R5b transfer contacts, R6b transfer contacts, R38b transfer contacts, to the other side of CB5—6.

It will be noted that each set of relays, for example, R1 and R2 and R36, if they remain de-energized, keep this part of the holding circuit closed. If they are energized concurrently this part of the holding circuit will also be closed. However, if either one is energized dissimultaneously and held energized by the aforementioned stick circuit through cam contacts C2, this part of the holding circuit will be broken.

Assuming that the type bars, one from each set, and readout brush of RO#1 are at the same digit positions in each order, when cam contacts CB5—6 open, the holding circuit for the R23 relay will be maintained. However, if any one comparing relay of a group R1, R2, and R36; or R3, R4, and R37; or R5, R6, and R38 is energized dissimultaneously the holding circuit will be broken when circuit breaker contacts CB5—6 open. These latter contacts thus provide a series of testing periods after each of the possible digit positions of the type bar. If no error in the position of the type bars has been detected, the R23 relay will remain energized.

It will be noted that the holding circuit for the R23 relay is through the C1 cam contacts and in shunt therewith the c contacts of the R1, R3, R5 and R36, R37, R38 relays, inclusive. The closure of any one of these c contacts maintains the stick circuit of the R23 relay closed when C1 cam contacts open.

The circuit for the latch magnet 89 is from the line 91, through cam contacts C22 (Fig. 9), R201d card lever relay contacts, R23c contacts normally open, latch magnet 89 to line 101. Therefore, if there is a conformity in the digit settings of the accumulator readout brushes and the type bars of both sets the R23 relay will be energized at the time that C22 cam contacts close; thus printing occurs in the cycle. If, however, the holding circuit for the R23 relay is open at any time when the circuit breakers CB3—4 open, or when cam contacts C1 open, the R23c relay contacts will be open at the time that the C22 cam contacts close to transmit an impulse to the latch magnet 89. Under such conditions, that is, a disconformity in the digit settings of the type bars of either set and the related accumulator readout brushes, latch magnet 89 will not be energized and printing will be inhibited.

ACCUMULATOR ENTRY

If the amount set up in both sets of type bars corresponds to the amount represented on the storage accumulator No. 1, the error relay R23 will remain energized and will be utilized as a means for effecting an entry in accumulator No. 2 under control of the RO#1 readout of accumulator No. 1. Three orders of each accumulator are shown in the wiring diagram but will, in practice, consist of many more according to the denominational magnitude of the entry. Accumulator No. 2 is of the type previously described and is provided with the customary transfer contacts and associated units transfer circuits so as to effect carries from order to order.

Assuming that no discrepancy has been found, the R23b contacts (Fig. 9) are closed during entry time which follows shortly after card reading time, and a circuit will be completed from line 107, through C8 cam contacts, R23b relay contacts now closed, R25a contacts normally closed, R22b contacts normally closed, R31 relay to line 101. The R31 relay will close the R31a (Fig. 9a) contacts so as to enable the cam contacts CB1—2 and C14 to transmit start impulses to the AM start magnets of accumulator No. 2 by the following described circuit. From line 107, through CB1—2 circuit breaker contacts, wire 118, cam contacts C14, R31a relay contacts now closed, thence through the R26a, b, c contacts normally closed, thence through the R32a, b, c contacts now in normal position to the AM or start magnets of accumulator No. 2 and to line 101. Thus, start impulses are directed to each AM start magnet in all the orders and the wheels will commence to turn. Their differential stop positions are under control of the readout RO#1 of accumulator No. 1 by circuits now to be described:

When cam contacts C8 (Fig. 9) close, an obvious circuit will be completed to the R28, R29, R30 relays and said relays are held during the entry portion of the cycle. The circuit for transmitting the stop impulses is from the line 107, CB1—2 circuit breaker contacts, wire 118, to the brush of the EM2 emitter, which engages the contact points thereof at differential times; thence by wires 119 the differentially timed impulses are transmitted through the R30, 0-9 relay contacts now transferred; thence in accordance with the differential positions of the brushes of the RO#1 readout, selected digit representing impulses are transmitted through the transferred R29, a, b, c relay contacts, connecting wires 120, through the R31a, b, c relay contacts now transferred, to the SM stop magnets to line 101. The impulses directed to these stop magnets will terminate the differential rotations of all the wheels and accumulator No. 2 will now have received the amount represented on the card. In successive entries the amounts will be accumulated therein so that at the end of a series of card interpreting operations the total amount will be represented on accumulator No. 2.

In those denominational orders in which the readout brushes RO#1 stand in the 0 position the impulse from the 15 spot of emitter EM2 coincides with the start pulse through C14 and the corresponding accumulator wheel of accumulator No. 2 remains in its same position.

UNITS CARRY CIRCUIT

The accumulator No. 2, being a summary accumulator, is provided with the conventional units carry circuits controlled by the carry contacts 142, 143 and 144 shown in Fig. 5. In view of the fact that such units carry circuits controlled by the accumulator wheels are well known, it will only be described generally. The carry circuits are operative during the time that cam contacts C9 (Fig. 9) energize the R32 relay. The energizing circuit is from line side 107, C9 cam contacts, R22f relay contacts normally closed, R32 relay, to line 101.

Referring to Fig. 9a the carry impulse is transmitted by the cam contacts C13 by a circuit from the line 107, through CB1—2, line 118, cam contacts C13, R32e relay contacts now closed, and thence through the 10 transfer contacts closed by the wheel of the units order, for example, thence through the R32b relay contacts, to the start magnet AM of the tens order. Carries by carries are effected to the next higher order, through the 9 transfer contact in the well known manner if the next higher order wheel should be standing at 9 and a units carry is made for this order.

To terminate the units rotation of each accumulator wheel to make a carry an impulse is directed to the SM stop magnets by a circuit from the line side 107, CB1—2, line 118, cam contacts C15, through the R32d relay contacts, thence through the R31a, b, c contacts now at normal position, to each of the stop magnets SM of accumulator No. 2.

RESETTING STORAGE ACCUMULATOR No. 1

It is, of course, necessary to condition the machine for the next machine operation by resetting the wheels and readout RO#1 of accumulator No. 1 after they have been utilized to effect the transfer of an amount in accumulator No. 2. The same impulses which are directed to the SM stop magnets of accumulator No. 2 under control of the RO#1 readout to transfer an amount to accumulator No. 2 are also transmitted to the start magnets AM of accumulator No. 1 and each accumulator wheel will be rotated complementally until it is at 0 digit position, at which time an impulse is directed to each of the stop magnets SM of the accumulator No. 1.

The impulsing circuit for the AM start magnets of accumulator No. 1 is from the RO#1 readout, through the R29a contacts now transferred, through the R28a, b, c relay contacts now transferred, to each of the AM start magnets, of the accumulator No. 1, to line 101. When all the wheels are at 0, all of the SM stop magnets are concurrently energized to declutch the accumulator wheels to retain them at 0 digit position. This impulse circuit is from the wire 118, through the C16 cam contacts, thence by wire 125 through the R27a, b, c relay contacts now in normal position, to each of the SM stop magnets of accumulator No. 1, to line 101.

TOTAL PRINTING FROM SUMMARY ACCUMULATOR No. 2

It is desirable at times to print the amount accumulated by accumulator No. 2 upon a card which is passed through the machine. This card may comprise the last card in a group and is blank with the exception that a selected column is punched at the X index point position. From the plug socket of the brush 31 which senses this particular column a plug connection 123 is made, as shown in Fig. 9a, to a plug socket connected through C11 cam contacts to the pickup coil of C22 relay, the other side being connected to line side 101. Cam contacts C11 are timed to close at the time the X index point position is being analyzed to the pickup winding P of the R22 coil to line 101. The latter closes its a contacts to provide a hold circuit for the holding winding which extends back to line 107 through cam contacts C10.

Referring to Fig. 9, it will be seen that R22 coil opens the R22f interlock relay contacts to disable the impulse circuit to the carry control magnet R32 and the R22b interlock relay contacts to disable the impulse circuit to the entry control magnet R31. When cam contacts C7 close an obvious circuit to the R34 total print control relay through R22g relay contacts will be closed, and the energized R34 relay will close its a, b and c contacts to thereby connect the readout RO#2 of accumulator No. 2 to the print magnets 58. The impulse circuit for the print magnets 58 under control of RO#2 readout is from line side 107, through CB1—2 contacts, wire 118, the brush of emitter EM2, and in accordance with the position of the brushes on the digit segments of the RO#2 readout selected digit impulses will be transmitted by wires 124, through the R34a, b, c contacts now transferred, thence through the R33a, b, c relay contacts, closed by energization of the circuit for the R33 relay previously described, plug connections 105, print magnets 58, plug connections 106, to line side 101. Impulsing the print magnets 58 will, in the same manner as if they were impulsed under control of the card, cause differential positioning of the type bars to print the total amount standing on the accumulator on the card.

It should be noted that the R33 relay is picked up by the C27 cam contacts after the 0 impulse is directed by emitter EM2 so, therefore, for those left-hand columns of the readout in which a 0 is represented, the associated type bars will go to their extreme left positions and at such positions an asterisk type is installed to print this character in corresponding columns. However, in intermediate zero digit representing columns zeros will be automatically printed by the zero print control shown in detail in the patent to R. E. Page, No. 2,019,869, patented November 5, 1935.

RESETTING OF ACCUMULATOR No. 2

The accumulator may also be reset in the same cycle in which the total is printed, and the reset operation is under control of an X perforation which is preferably in an adjacent column of a card. The analyzing brush 31 which senses such X perforation is not shown but has a plug connection 126 (Fig. 9a) which picks up the R21 relay through cam contacts C12, the duo-wound relay being held energized through the R21a relay contacts and C10 cam contacts. The R21 relay transfers the R21b relay contacts (Fig. 9) so that during the closure of cam contacts C7 the R26 relay will be energized, which latter transfers its a, b, c contacts in Fig. 9a. Therefore, the same digit impulses which energize the print magnets 58 are directed through such contacts and through the normally closed R32a, b, c relay contacts to the AM start magnets of accumulator No. 2. Each accumulator element will be given a complementary rotation to bring it from its digit position to 0. The termination of the rotation of the accumulator elements at 0 is provided by a circuit from line 118, cam contacts C17, the R26d relay contacts, through the R31a, b, c relay contacts now in normal position, SM stop magnets of accumulator No. 2, to line 101.

MEANS FOR DETECTING PASSAGE OF BLANK CARDS THROUGH THE MACHINE AND PREVENTING OF PRINTING ALL AMOUNTS THEREON

To prevent printing on a card when the amount field is blank or represents 0 in all columns, the following arrangement is employed:

It will be seen from Fig. 9 that the cam contacts C1 are shunted by the c and d contacts of the R1, R3 and R6 relays, and the d contacts of the R36, R37 and R38 relays. It is evident that if none of the columns is perforated or represents 0 none of these contacts will be closed when cam contacts C1 open. Therefore, the holding circuit of the R23 relay will be open at this time. This will cause the latch magnet 89 to remain deenergized and printing will be prevented.

However, in taking a total it was stated that the card was blank in these columns and to prevent the suppression of printing which would be normally effected by the circuit just described, the R25 relay, which is connected in parallel with relay R22, is provided with contacts R25b (Fig. 9) which also shunt the C1 cam contacts. Therefore, when such cam contacts are open the holding circuit for the R23 relay will be held by the R25b relay contacts and printing of the total will be carried out in the previously described manner.

MODIFICATION

Fig. 10 represents a modification to the wiring diagram to effect another desirable checking function.

The circuit is slightly different for detection of blank columns of a card passing through the machine. If all of the columns are blank the holding circuit for R23 relay opens when C1 cam contacts open at 145°. It will be observed that the holding circuit for R23H is by a wire 126 through the normally closed relay contacts R1d, R3d, R5d, and open at the latter contacts if a card column is blank, and since these contacts are not connected to line side 107 the holding circuit for R23 opens when C1 cam contacts open, and printing will be prevented.

The modified wiring diagram serves to detect the positioning of a type bar which is at the right of the significant digit of the highest denominational order to an asterisk printing position instead of a zero digit position. This may come about due to improper adjustment of parts so that a type bar goes beyond 0 to the * position.

If all of the type bars go to a digit position 1–9 or 0, a hold circuit for R23H will be completed after C1 cam contacts open which extends from R23H, wire 126, R1d contacts now transferred, and then serially through the following closed contacts R1c, R36d, R3c, R37d, R5c, R38d, C4 cam contacts to line 107. If a type bar goes to an * position its contacts 168a, or 168b will not be closed; therefore one of the above relay contacts will be open and R23 will deenergize after C1 opens. In the manner previously explained printing from this card will be suppressed.

While there have been shown and described and pointed out the fundamental novel features of the invention, it will be understood that various omissions and substitutions and changes in the form and details of the device illustrated and in its operation may be made by those skilled in the art without departing from the spirit of the invention. It is the intention, therefore, to be limited only as indicated by the scope of the following claims:

What is claimed is:

1. In a machine of the class described, the combination of an accumulator, an entry means therefor, two sets of type bars, type bar positioning means for each set, digit storage means including a digit readout means positioned thereby to represent any of the digit positions 0–9, means for reading out said readout means twice, once for determining its digit position and second for controlling said accumulator entry means, digit storage setup means, means for analyzing a record representing a value, means under control of said analyzing means to control said type bar positioning means to effect a differential positioning of the two sets of type bars to select type for twice printing the value, means under control of said analyzing means to control said digit storage setup means to set up said digit storage means to represent by its readout means the value represented on the record, comparing means controlled by said readout means when it is first read out and both sets of type bars for comparing the digit position of a type bar in each set with the digit position of the readout means of the same order, means controlled by said comparing means to render said readout means effective when it is read out the second time for causing an accumulator entry when the digit readout means and both sets of type bars have corresponding digit positions and said readout means ineffective for an accumulator entry when the digit readout means and any type bar of either set have non-corresponding digit positions in any order.

2. In a record controlled machine, printing means including an amount manifesting means, differentially settable digital type members for a plurality of orders, differentially settable digital storage means for a corresponding plurality of orders, said storage means including in each order an electrical readout set thereby to corresponding digital positions, record analyzing means, means under control of said analyzing means to concurrently and differentially set said storage means and said type members during digital index times to presumably coinciding digital positions, individual contact devices associated with the respective ones of said type members and each adapted to be closed by its related type member at the index time when the latter assumes its differentially set digital positions, means under control of said individual contact devices and the orders of the readout to compare, independently for each order, after every digital index time, the coincidence or lack of coincidence of digital settings of the contact devices pertaining to said type members and the related orders of the readout, means for transferring the digital amount represented on said readout to said amount manifesting means, and means controlled by said comparing means, on finding a coincidence in the setting of the contact devices and related orders of said readout in all orders thereof, for taking an impression from said type members and for effecting an operation of said amount transferring means.

3. In a record controlled machine, printing means including an accumulator, differentially settable digital type members for a plurality of orders, differentially settable digital storage means for a corresponding plurality of orders, said storage means including in each order an electrical readout set thereby to corresponding digit positions, record analyzing means, means under control of said analyzing means to concurrently and differentially set said storage means and said type members during digital index times to presumably coinciding digital positions, individual contact devices associated with the respective ones of said type members and each adapted to be closed by its related type member at the index time when the latter assumes its differentially set digital positions, means to compare, independently for each order, after every digital index time, the coincidence or lack of coincidence of digital setting of the contact devices pertaining to said type members and the related orders of the readout, means for transferring the digital amount represented on said readout to said accumulator, means controlled by said comparing means, on finding a coincidence in the setting of the contact devices and related orders of said readout in all orders thereof, for taking an impression from said type members and for effecting an operation of said transferring means.

4. In a record controlled machine, printing means including differentially settable digital type members for a plurality of orders, differentially settable digital storage means for a corresponding plurality of orders settable independently of the type members, said storage means including in each order an electrical readout set thereby to corresponding digit positions, record analyzing means, means under control of said analyzing means to concurrently and differentially set said storage means and said type members during digital index times to presumably coinciding digital positions, individual contact devices associated with the respective ones of said type members and each adapted to be closed by its related type member at the index time when the latter assumes its differentially set digital positions, electroresponsive means for each order of said readout and adapted under control of the readout order to take a setting in each order at the index time the related type member assumes its differentially set digital position, other electroresponsive means for each order of said type member adapted under control of said individual contact devices to take a setting at the index time said type member assumes its differentially set digital position, means to compare, independently for each order, after every digital index time, the coincidence or lack of coincidence of digital setting of the electroresponsive means pertaining to said type members and the related orders of the readout, means for reading out an amount under control of said readout, means controlled by said comparing means, on finding a coincidence in the setting of the electroresponsive means in all orders thereof, for taking an impression from said type members and for causing an operation of the reading out means, and means under control of said electrical readout for resetting said storage means to normal after the comparing operation.

JONAS E. DAYGER.
ASA N. MILLER.

REFERENCES CITED

The following references are of record in the file of this patent:

UNITED STATES PATENTS

| Number | Name | Date |
|---|---|---|
| 2,343,398 | Bryce | Mar. 7, 1944 |